United States Patent
Flesch et al.

(10) Patent No.: US 11,959,664 B2
(45) Date of Patent: Apr. 16, 2024

(54) DEVICE AND METHOD FOR THERMAL-ELECTROCHEMICAL ENERGY STORAGE AND ENERGY PROVISION

(71) Applicant: KARLSRUHER INSTITUT FÜR TECHNOLOGIE, Karlsruhe (DE)

(72) Inventors: Jonathan Flesch, Berlin (DE); Klarissa Niedermeier, Karlsruhe (DE); Dennis Otte, Leonberg (DE)

(73) Assignee: Jonathan Flesch (DE)

( * ) Notice: Subject to any disclaimer, the term of this patent is extended or adjusted under 35 U.S.C. 154(b) by 580 days.

(21) Appl. No.: 17/265,807

(22) PCT Filed: Aug. 2, 2019

(86) PCT No.: PCT/EP2019/070911
§ 371 (c)(1),
(2) Date: Feb. 3, 2021

(87) PCT Pub. No.: WO2020/025802
PCT Pub. Date: Feb. 6, 2020

(65) Prior Publication Data
US 2021/0164696 A1    Jun. 3, 2021

(30) Foreign Application Priority Data

Aug. 3, 2018    (DE) .................... 10 2018 213 018.3

(51) Int. Cl.
*F24S 60/20*    (2018.01)
*C09K 5/06*    (2006.01)
(Continued)

(52) U.S. Cl.
CPC ............. *F24S 60/20* (2018.05); *C09K 5/063* (2013.01); *F24S 20/20* (2018.05); *F28D 20/003* (2013.01)

(58) Field of Classification Search
CPC ...... F28D 20/003; F28D 20/025; F28D 20/02; H01M 10/399; H01M 10/66;
(Continued)

(56) References Cited

U.S. PATENT DOCUMENTS

2015/0303524 A1*    10/2015    Epstein ............... H01M 10/615
429/103

FOREIGN PATENT DOCUMENTS

CN    106953352    *    7/2017
CN    105888994    *    4/2019

OTHER PUBLICATIONS

Wenger, Erez, et al., Thermo-electro-chemical storage (TECS) of solar energy, Applied Energy, Mar. 2017, vol. 190, pp. 788-799.

* cited by examiner

*Primary Examiner* — Alfred Basichas
(74) *Attorney, Agent, or Firm* — Diana Mederos; Mederos Legal, PLLC

(57) ABSTRACT

The invention proposes a method and a device (110) for thermal-electrochemical energy storage and energy provision. The device (110) comprises: at least one thermal energy store (118), wherein the thermal energy store (118) comprises at least one heat transport medium (121) and at least one storage medium (119) selected from the group consisting of: an electromagnetic storage medium, a thermal storage medium; at least one heating device (134), wherein the heating device (134) is designed to receive the heat transport medium (121) from the thermal energy store (118), to heat this medium and return it to the thermal energy store (118); at least one electrochemical cell (146), wherein the electrochemical cell (146) comprises at least one gas chamber (148), wherein the electrochemical cell (146) further comprises at least one first electrode (150) and at least one second electrode (152): wherein the second electrode (152)
(Continued)

Figure 1:
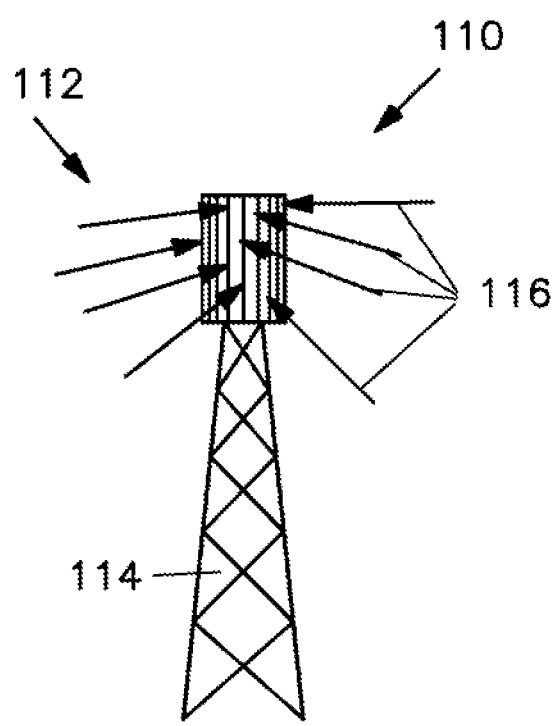

is designed as a 3-phase electrode (154), wherein the 3-phase electrode (154) has at least one first phase boundary (156) to the gas chamber (148) and at least one second phase boundary (158) to the electrochemical storage medium (119); wherein the electrochemical cell (146) is designed to electrochemically react the electrochemical storage medium (119); and at least one container (160), wherein the container (160) is designed to receive a supply on the heat transport medium (119), wherein the container (160) is further designed to receive the thermal storage medium (119) from the thermal energy store (118).

3 Claims, 5 Drawing Sheets

(51) Int. Cl.
*F24S 20/20* (2018.01)
*F28D 20/00* (2006.01)

(58) Field of Classification Search
CPC .... H01M 10/659; H01M 10/627; F24S 60/20; F24S 60/10; F24S 20/20; C09K 5/063
See application file for complete search history.

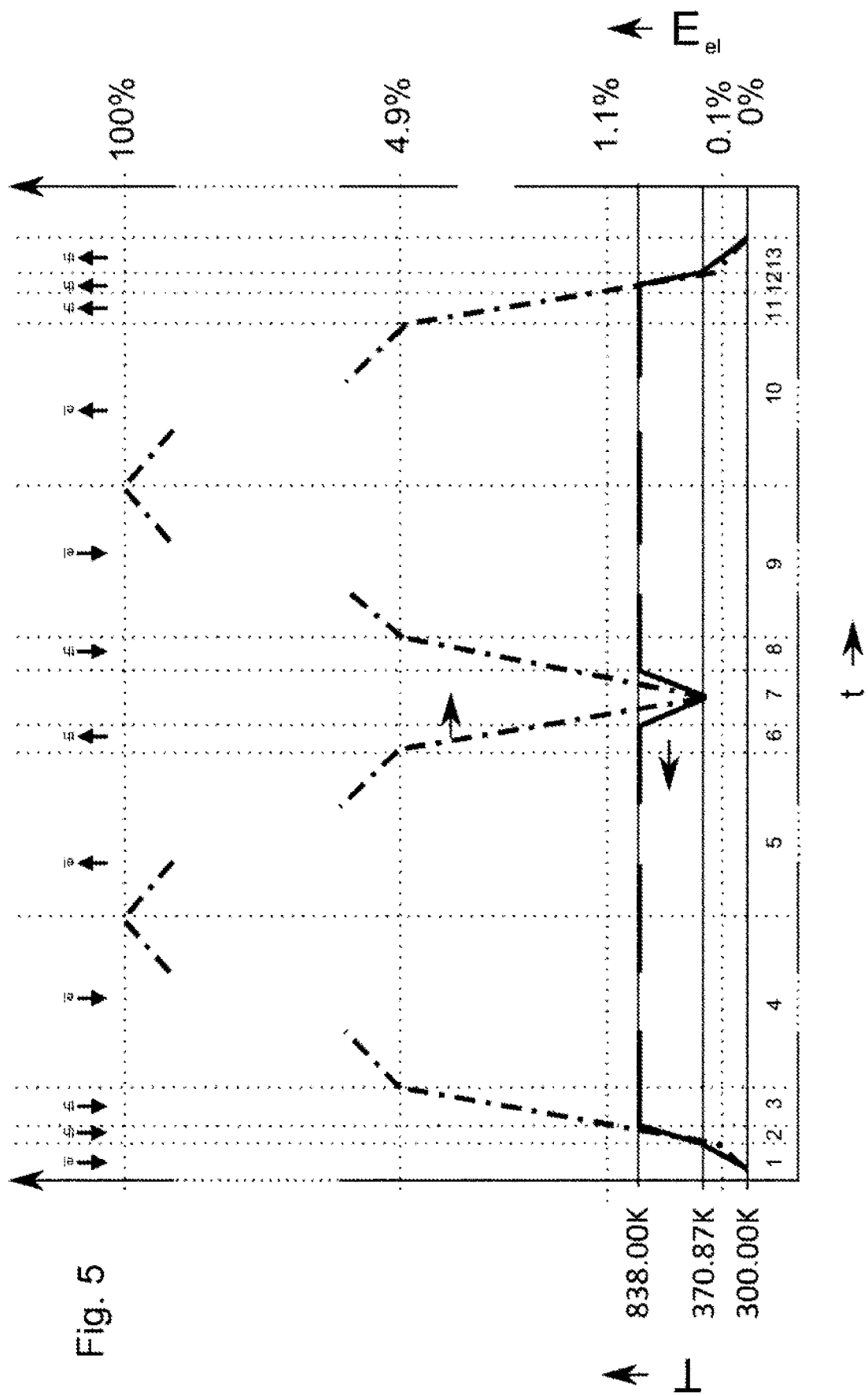

DEVICE AND METHOD FOR THERMAL-ELECTROCHEMICAL ENERGY STORAGE AND ENERGY PROVISION

FIELD OF THE INVENTION

The present invention relates to a device and a method for thermal-electrochemical energy storage and energy provision, and to a use of the device. In particular, the invention relates to the field of electrical and thermal energy generation, distribution and storage. The device may be arranged for short-term storage and long-term storage of electrical energy. Furthermore, the device may be arranged for short-term storage, in particular short-term storage for a period of less than 48 hours of thermal energy. In particular, the device may be used in solar thermal power plants.

PRIOR ART

Devices and methods for thermal-electrochemical energy storage and energy provision are already known from the prior art. Energy storage devices basically serve to store energy for later use. In case of need, the energy can be provided. In principle, thermal storage units can comprise salt mixtures. The salt mixtures can in particular be phase change materials. They may be latent heat storage materials capable of storing phase change materials with a high thermal storage capacity above and/or below an ambient temperature for an extended period of time. Their mode of operation is based in particular on exploiting reversible thermodynamic changes in the state of a storage medium, such as in a phase transition from solid to liquid. The phase change material can thus change its state of aggregation during thermal storage and thus store an energy required for the phase change without any further increase in temperature. In principle, there are a large number of phase change materials suitable for use in thermal storage systems, but a general material compatibility with a primary heat transport medium cannot exist, which will be discussed in more detail below. Usually, therefore, the heat transport medium and the latent storage medium are not in direct contact, but are basically separated from each other by barriers for mass transport. This can be done, for example, by encapsulating the phase change materials or by enclosing the heat transport fluid stom, for example in piping. These encapsulations can provide an additional thermal barrier to heat transfer to the phase change material and increase investment costs due to a required step of encapsulation.

U.S. Pat. No. 4,421,661 A describes a high temperature direct contact thermal energy storage device element for use in a system for storing and recovering thermal energy in the range of about 400° to about 2000° F. The thermal energy is stored directly, without heat exchange tubes in the latent composite or heat transfer storage media for sensible heat, utilizing the heat of fusion and high temperature stability of alkali metal and alkaline earth carbonates, chlorides, nitrates, nitrites, fluorides, hydroxides, sulfates, and mixtures, which itself is held in a porous support structure material and is capable of storage as sensible heat. The thermal energy storage device according to the invention can be effectively used to store thermal energy derived from solar, industrial waste, process heat and high temperature gas reactor energy sources and recovered for a wide variety of applications such as combustion air preheating and drying, such as space heating, heating of process gases and the like.

In US2016/0201995 A1, a system for storing and recovering thermal energy is described. At least one phase change material (solid-liquid) and a sensible heat solid material is used as a medium for storing/recovering heat coming from an external source. The aforementioned materials are properly housed in a single tank containing at least two zones that differ in the temperature range to which they are exposed. Each zone contains a different material. The most common configuration consists of three different zones located inside the tank, namely: a hot zone located in the upper part of the tank, enclosing an encapsulated phase change material characterized by a high melting temperature; a cold zone located in the lower part of the tank, containing a phase change material with a low melting temperature; and a middle zone containing a sensible heat solid material.

WO 2014/033712 A2 describes an energy conversion and storage system and method in which a battery catholyte composition is decomposed (e.g., after or during a discharge process) by heating to produce a decomposed catholyte and to separate an anolyte component therefrom, thereby enabling use of the anolyte.

In Current Opinion in Solid State and Materials Science 16 (2012) 168-177, sodium and sodium ion energy storage batteries are described. In particular, the challenges of current high temperature sodium technologies including NaS and Na—$NiCl_2$ and liquid sodium technologies are summarized. Furthermore, developments in positive and negative electrode materials suitable for sodium ion and hybrid Na/Li ion cells are described.

DE 709741 A relates to the production of sodium by electrolysis of a molten mixture of chloromatrium and chlorcalcium in cells which allow free flow of electrolyte into the electrolysis zone, in particular in cells in which a centrally located electrode is annularly surrounded by the second electrode and an annular diaphragm is located between the electrodes, such as those known as Downs cells.

U.S. Pat. No. 9,431,681 B2 describes a molten sodium secondary cell that charges at a high temperature and discharges at a relatively low temperature. The cell includes a sodium anode and a cathode. A sodium ion conducting solid membrane separates the cathode from the sodium anode and selectively transports sodium ions. A solar energy source includes a photovoltaic system to provide an electrical charging potential to the sodium anode and cathode, and a solar thermal concentrator to provide heat to the cathode and catholyte composition to charge the molten sodium secondary cell at a temperature in this range from about 300 to 800° C. The cell has a charge temperature and a charge voltage and a discharge temperature and a discharge voltage. The charge temperature is much higher than the discharge temperature and the charge voltage is lower than the discharge voltage.

EP 2 394 321 B1 describes an electrochemical cell which, according to one embodiment of the invention, comprises a first electrode containing a first phase mixed with a second phase and a network of interconnected pores. The first phase includes a ceramic material and the second phase includes an electrically conductive material that provides an electrically continuous path through the first electrode. The electrochemical cell further comprises a second electrode comprising an alkali metal. A substantially non-porous alkali metal ion-selective ceramic membrane, such as a dense Nasicon, Lisicon, Li-β-alumina, or Na-β-alumina membrane, is disposed between the first and second electrodes.

A disadvantage of known methods is that there cannot generally be material compatibility with a primary heat transport medium. In addition, it is not generally possible to rebuild a fixed bed from a molten fixed bed of a phase change material after it has cooled. For this reason, phase change materials are usually encapsulated, for example in small metal spheres or in at least nearly closed troughs or spheres. These capsules can provide an additional thermal barrier to heat transfer to the phase change material and increase investment costs due to the required step of encapsulation. Furthermore, electrochemical cells very often feature a membrane. The membrane can represent an additional barrier for heat and mass or charge carrier transport. In particular, the membrane can be chemically attacked, clogged, or cracked.

OBJECT OF THE INVENTION

Based on the above, it is an object of the present invention is to provide a device and a method for thermal-electrochemical energy storage and energy provision, as well as a use of the device, which at least partially overcome the mentioned disadvantages and limitations of the prior art.

In particular, the device and the method shall enable a high storage density. Furthermore, a low-cost storage concept shall be realizable and a number of additional components such as heat exchangers shall be reduced. Furthermore, electrochemical storage media shall be made available which can provide energy over long periods, for example after storage in summer, during which a lot of electricity is generated from photovoltaics due to the many hours of sunshine, until winter. Thus, despite a high installed generation capacity of wind and photovoltaic systems, it should be possible to reduce supply gaps occurring on days in winter without wind and sun.

DISCLOSURE OF THE INVENTION

This task is solved by a device and a method for thermal-electrochemical energy storage and energy provision as well as by a use of the device. Advantageous further embodiments, which can be realized individually or in any combination, are shown in the dependent claims.

In the following, the terms "having", "containing", "comprising" or "including" or any grammatical variations thereof are used in a non-exclusive manner. Accordingly, these terms may refer both to situations in which, in addition to the features introduced by these terms, no other features are present, or to situations in which one or more other features are present. For example, the expression "A has B", "A contains B", "A comprises B", or "A includes B" may refer both to the situation in which, apart from B, no other element is present in A (i.e., a situation in which A consists exclusively of B), and to the situation in which, in addition to B, one or more other elements are present in A, for example, element C, elements C and D, or even other elements.

It is further noted that the terms "at least one" and "one or more", as well as grammatical variations of these terms, when used in connection with one or more elements or features and intended to express that the element or feature may be provided singly or multiple times, are generally used only once, for example, when the feature or element is first introduced. When the feature or element is subsequently mentioned again, the corresponding term "at least one" or "one or more" is generally no longer used, without thereby limiting the possibility that the feature or element may be provided one or more times.

Further, the terms "preferably," "in particular," "for example," or similar terms are used hereinafter in connection with optional features without limiting alternative embodiments herein. Thus, features introduced by these terms are optional features, and it is not intended to limit the scope of protection of the claims, and in particular the independent claims, by these features. Thus, as will be recognized by those skilled in the art, the invention may be carried out using other embodiments. Similarly, features introduced by "in one embodiment of the invention" or by "in one embodiment of the invention" are understood to be optional features without intending to limit alternative embodiments or the scope of protection of the independent claims. Further, these introductory expressions are intended to leave intact all possibilities of combining the features introduced thereby with other features, whether optional or non-optional.

In a first aspect, the present invention relates to an device for thermal-electrochemical energy storage and energy provision. The device comprises:

at least one thermal energy storage device, the thermal energy storage device comprising at least one heat transport medium and at least one storage medium selected from the group consisting of: an electrochemical storage medium, a thermal storage medium;

at least one heating device, wherein the heating device is adapted to receive the heat transport medium from the thermal energy storage device, heat it, and return it to the thermal energy storage device;

at least one electrochemical cell, the electrochemical cell comprising at least one gas compartment, the electrochemical cell further comprising at least one first electrode and at least one second electrode; wherein the second electrode is configured as a 3-phase electrode, the 3-phase electrode having at least a first phase boundary to the gas compartment and at least a second phase boundary to the electrochemical storage medium; wherein the electrochemical cell is adapted to electrochemically convert the electrochemical storage medium; and at least one container, wherein the container is adapted to receive a supply of the heat transport medium, wherein the container is further adapted to receive the thermal storage medium from the thermal energy storage device.

The term "thermal-electrochemical energy storage and energy provision" generally refers to any concept for storing energy, particularly energy, especially for later use. The energy can be basically converted back in a case of need. Energy storage can in principle be classified according to a stored form of energy, although an energy form that differs from this can often be used in a charging process and/or in a discharging process. Through this, energy can be stored simultaneously as both thermal energy and electrical energy, and when needed, can be provided again simultaneously in the form of thermal energy and of electrical energy.

Therefore, in the context of the following invention, the term "thermal energy storage device" generally means any thermal energy storage device which stores thermal energy. The structural features of the thermal energy storage device will be described in more detail below. The thermal energy storage device may also be arranged to simultaneously serve as a storage device for electrochemical energy carriers.

The thermal-electrochemical energy storage and energy provision device may also be arranged for thermal-electrochemical energy generation and thermal-electrochemical energy distribution. In particular, the device may be suitable for short- and long-term storage of electrical energy and for short-term storage, in particular for storage over a period of less than 48 hours, of thermal energy. In particular, the device can be used in solar thermal power plants. Furthermore, the device may be suitable for combining a plurality of temporally dynamic producers into a constant power source in a grid network.

The thermal energy storage device may in particular be designed as a container. By a "container" may be understood, in principle, any vessel which serves to store or transport a substance in the vessel. The thermal energy storage device can therefore also be referred to as a storage container. As explained above, the thermal energy storage device comprises at least one storage medium and at least one heat transport medium. The term "heat transport medium" basically refers to any substance that is suitable for absorbing thermal energy and subsequently releasing or transferring thermal energy to another substance. The heat transport medium may in particular be or comprise sodium. The term "storage medium" basically refers to any substance which is suitable for storing energy and releasing the energy again. In particular, the storage medium may be an electrochemical storage medium. Furthermore, the storage medium can be a thermal storage medium. The term "thermal storage medium" basically refers to any storage medium that is set up to store and release energy, in particular thermal energy, in particular by transition to another aggregate state.

The term "electrochemical storage medium" basically refers to any storage medium that is set up to store energy and, in particular by a chemical conversion, to release the energy again. The electrochemical storage medium can therefore be set up as a heat transport medium. Further, the electrochemical storage medium may be arranged as a reaction product of an electrochemical storage.

The electrochemical storage medium may comprise sodium-cations and chloride-anions, particularly in a liquid aggregate state. The thermal storage medium may comprise sodium chloride and calcium chloride, particularly in a solid aggregate state. The sodium chloride may be particularly suitable for storing energy. The calcium chloride may be admixed with the sodium chloride to adjust a melting point of a mixture of calcium chloride and sodium chloride. Mixtures of the sodium chloride with substances other than calcium chloride may also be used. For example, a mixture of sodium chloride, calcium chloride and barium chloride may be used. For example, a mixture of sodium chloride and strontium chloride can be used. Other mixtures are also conceivable in principle.

Sodium chloride, calcium chloride and sodium may be present in the thermal energy storage device in the aggregate states solid and liquid. Furthermore, the thermal energy storage device may comprise chlorine, which may be gaseous and/or liquid. The thermal energy storage device may further comprise one or more inlets and/or outlets for sodium and/or sodium chloride. The inlets and/or the outlets may be arranged, in particular, at a container bottom of the thermal energy storage device.

The thermal energy storage device may comprise a fixed bed of particles. The particles may include sodium chloride and calcium chloride. The term "fixed bed" generally refers to any accumulation of particles. In particular, individual particles of the backfill may contact each other, in particular by point contacts, and channels, in particular free channels, may be located between the particles. The channels, in particular the free channels, may have a fluid flowing through them. The calcium chloride may be arranged to adjust a melting point. In particular, the calcium chloride may be admixed with the sodium chloride to achieve a melting point of a mixture of calcium chloride and sodium chloride of below 560° C. The fixed bed may have a melting point in the interval between 500° C. to 805° C., if those are present in pure form. The sodium chloride and the calcium chloride may be in a solid state of aggregation at a temperature of 120° C. to 170° C., in particular at a temperature of 150° C. The fixed bed may be arranged to liquefy when energy is applied.

The fixed bed may in particular be configured as a phase change material. The term "phase change material" generally refers to any material that is configured as a latent heat storage material. The latent heat storage material can be set up to be able to store a high proportion of heating and cooling energy over a long period of time and to be able to release it again with at least virtually no loss. One mode of operation of the latent heat accumulator can be based in particular on the utilization of reversible thermodynamic changes of state of a storage medium, such as in a phase transition from solid to liquid. The phase change material can thus change its state of aggregation during the thermal storage process and thereby store an energy required for the phase change without further temperature increase.

At a temperature of 120° C. to 170° C., in particular at a temperature of 150° C., the sodium may be in a liquid aggregate state. Therefore, the sodium can be used as a fluid. In particular, the sodium can fill the free channels of the packed bed.

As stated above, the device comprises the heating device. The term "heating device" generally refers to any device that is adapted to heat another object, i.e., to provide heat to the other object. In particular, the heating device can be designed as a continuous flow heater. In this case, heat can be delivered continuously. The device may be arranged to demand the sodium, in particular liquid sodium, from the thermal energy storage device by means of a pump to the heating device. The heating device may be arranged to heat the sodium. For example, the heating device may be configured as a solar thermal tower power plant. The device may further comprise at least one tower having at least one tower top, and the heating device may be attached to the tower top.

The heating device may be configured to receive solar energy from an environment surrounding the heating device. Further, the heating device may be arranged to heat the sodium using sunlight, particularly concentrated sunlight. This may cause the temperature of the sodium to rise. The heating device may be arranged to heat the sodium to a temperature of at least 500° C. and at most 850° C., preferably 850° C. The device may further be adapted to return the sodium to the thermal storage container at a temperature of at least 500° C. and preferably at most 850° C. The device may further comprise at least one pump. The pump may be arranged to transport the sodium from the thermal energy storage device vessel to the heating device.

The term "electrochemical cell" basically refers to any cell comprising at least two electrodes and at least one electrolyte. The electrochemical cell may be arranged to force a redox reaction by applying an external voltage. The electrochemical cell may comprise a DC voltage source arranged to provide electrical energy. In this regard, the electrical energy may be arranged to be at least partially converted into chemical energy. In particular, the electrochemical cell may be configured as an electrochemical storage cell. The electrochemical storage cell may be arranged to store electrical energy or to make it available again when required. The electrochemical energy storage device may further comprise at least one transport device configured to transport the storage medium to the electrochemical cell.

As stated above, the electrochemical cell includes the at least one first electrode and the at least one second electrode. The terms "first electrode" and "second electrode" are to be considered purely descriptive and as mere designations, without indicating any order of precedence and, for example, without excluding the possibility that multiple types of first electrodes and multiple types of second electrodes, or exactly one type each, may be provided. Further, additional electrodes, for example third electrodes, may be provided. The term "electrode" basically refers to any electron conductor which is arranged to interact, in an interaction with a counter electrode, with a medium located between the two electrodes, in particular an electrolyte. The electrode may be made entirely or at least partially of an electrically conductive material, in particular a metallic material. The first electrode and the second electrode can each be switchably designed as a cathode and an anode, respectively.

For example, the first electrode may initially be formed as an anode and the second electrode may initially be formed as a cathode. By switching the electric current, the first electrode can be formed as a cathode and the second electrode can be formed as an anode. The term "anode" basically refers to any electrode that is set up to discharge anions or generate cations from an electrolyte with an electron pickup. The anode is therefore set up to allow oxidation reactions to take place. The term "cathode", on the other hand, basically refers to any electrode that is set up to exclude electrons. Thus, the cathode is set up to allow reduction reactions to take place.

The electrochemical cell may be arranged to convert sodium cations of sodium chloride to elemental sodium and to convert chloride anions of sodium chloride to chlorine, in particular to chlorine gas.

As stated above, the second electrode is formed as a 3-phase electrode. The term "3-phase electrode" basically refers to any electrode which has a common phase boundary to a gas compartment, in particular to a gas compartment of an electrochemical cell, and to an electrolyte. The term "phase boundary" basically refers to any interface between two or more different phases. In particular, the interface may be located between a liquid phase and a gaseous phase. In particular, the liquid phase may comprise the electrolyte, in particular the mixture comprising sodium and sodium chloride. By a "gas compartment" is basically meant any volume adapted to receive gas, in particular the chlorine gas.

As discussed above, the device further comprises the container. The container is adapted to receive a supply of the heat transport medium, in particular sodium. Further, the container is adapted to receive the storage medium from the thermal energy storage device. The container may therefore be fluidically connected to the thermal energy storage device. In particular, the container may be or comprise another thermal energy storage device. Further, the device may comprise at least one gas container, in particular at least one gas cylinder. The gas container may be adapted to receive the chlorine gas.

In another aspect of the present invention, a method for thermal-electrochemical energy storage and energy provision is proposed. The method may comprise the method steps which are described below. The method steps may, for example, be carried out in the given order. However, a different sequence is also conceivable. Furthermore, one or more method steps may be carried out simultaneously or overlapping in time.

Furthermore, one, several or all of the method steps may be performed singly or repeatedly. The method may further comprise additional method steps.

The method comprises the following method steps:
a) providing a device as already described or as will be described in the following;
b) thermally charging the thermal energy storage device, wherein the heat transport medium is heated to a temperature of from 500° C. to 850° C., in particular from 800° C. to 850° C., wherein the heat transport medium at least partially changing into a liquid phase;
c) electrochemical conversion of the electrochemical storage medium by means of the electrochemical cell;
d) electrochemical back reaction by means of the electrochemical cell, whereby the electrochemical storage medium is reformed; and
e) flowing the electrochemical storage medium into the container, wherein the electrochemical storage medium transitions to a thermal storage medium, releasing thermal energy.

In step c) and/or in step d), an electrochemical potential may be generated. In particular, in step c) and/or in step d), an electrochemical potential difference can occur that allows a usable electric current to flow, by which the electrochemical storage medium is re-formed.

In particular, in step e), the electrochemical storage medium can take over a function of the thermal storage medium, which is arranged to release thermal energy by solidifying from a liquid aggregate state to a solid aggregate state. A release of thermal energy can basically occur during solidification and a transition to the solid aggregate state.

The term "thermal charging" basically refers to any process in which heat is supplied to an object. A temperature or temperature distribution of the object can be increased by this process. Step b) can therefore also be referred to as the thermal charging phase. Initially, sodium may be present in a solid aggregate state. As a result, the sodium cannot be pumped in principle. The sodium can, for example, be heated to a temperature of at least 90° C. and preferably 150° C. by a trace heating at the thermal energy storage device. Subsequently, the sodium can be demanded to the heating device, in particular to a solar receiver, to be heated to a temperature between 500° C. and 850° C., preferably 800 to 850° C.

At the beginning of the charging phase, the fixed bed of particles comprising sodium chloride and calcium chloride may be in a solid aggregate state at about 150° C. in the thermal energy storage device. At the temperature of 150° C., the sodium may be present in liquid form and used as a fluid filling the free channels of the packed bed. The liquid sodium can be conveyed by the pump from the thermal energy storage device to the heating device. This can be particularly advantageous, since in this case basically no heat exchanger is required to transfer thermal energy from the heating device to the thermal storage medium in the thermal energy storage device.

However, other embodiments of the device are also conceivable in principle. It is in principle possible to transfer heat to the sodium in the container through another heat transport medium, such as liquid solar salt from a solar thermal power plant. Accordingly, the pump can in principle not be set up exclusively for the transport of sodium, but in general for any heat transport media.

In the heating device, concentrated sunlight may be directed onto piping through which the sodium flows, which may result in a temperature rise of the sodium. The sodium can thereby be heated to a temperature between 500° C. and 850° C., preferably between 800° C. and 850° C. At this temperature, it is circulated back into the storage tank and re-enters the tank at the bottom, where the sodium chloride is still at 150° C. The sodium can flow through the free channels between the particles and transfer its thermal energy to the particles. With a sustained supply of energy, particularly from the sun, to sodium and from sodium to the packed bed, the temperature of the packed bed can rise. At just above 500° C. to just above 800° C. (depending on the amount of calcium chloride present), the melting point of the particles can be reached. The particles can become liquid after further energy is added by the sodium. Due to a lower density of sodium compared to sodium chloride and calcium chloride, the molten salt mixture can sink to the bottom of the thermal energy storage device tank. Particles that are still solid can sink to the bottom, where they can also become liquid in contact with hot sodium from the heating device. The sodium chloride and the calcium chloride can completely or at least almost completely change into the liquid phase. In particular, a liquid sodium chloride-calcium chloride phase may form at the bottom of the thermal energy storage device, upon which a sodium phase floats.

Step b) may in particular comprise the following substeps:
b1) transporting the heat transport medium into the heating device;
b2) heating the heat transport medium to a temperature between 500° C. to 850° C., in particular between 800° C. and 850° C.;
b3) transporting the heat transport medium into the thermal energy storage device.

Prior to carrying out step b1), heating of the thermal energy storage device to a temperature of 120° C. to 170° C., in particular to 150° C., may be carried out, whereby the heat transport medium changes into a liquid phase. In this step, the heating may be carried out in particular electrically and/or by a gas burner.

In step b1), the sodium may be transported from the thermal energy storage device to the heating device by means of the pump. In step b2), the heating device can receive solar energy from an environment of the heating device. In step b3), the sodium can enter at a bottom of the thermal energy storage device. After step b3), the sodium can release thermal energy to the sodium chloride after heating.

The term "electrochemical conversion" generally refers to any process in which a substance is converted into another substance by an electrochemical process, in particular by an oxidation or by a reduction.

The electrochemical storage medium may comprise sodium chloride, and step c) may in particular comprise the following substeps:
c1) applying an electric current to the electrochemical cell;
c2) converting sodium cations of the sodium chloride to sodium at the first electrode, the first electrode being connected as a cathode; and
c3) converting chloride anions of the sodium chloride to chlorine at the second electrode, the second electrode being connected as an anode.

In this process, the chlorine may be received in the gas container. Step c) may be started when step b) has not yet been completed. Steps b) and c) can therefore be carried out at least partially simultaneously. In particular, step c) can be initiated when the sodium chloride is in the liquid aggregate state. Step c) can therefore also be referred to as the electrochemical charging phase. Preferably, the NaCl can be electrochemically converted as soon as the NaCl is liquefied. In principle, as little liquid NaCl as possible should be present. Therefore, steps b) and c) can preferably be carried out simultaneously.

In step c), a portion of the sodium chloride phase can be supplied to the electrochemical cell. By supplying electric current, the sodium cations can react at the cathode of the electrochemical cell to form elemental sodium, and at the anode, the chloride anions can react to form $Cl_2$ gas.

The chlorine gas can then be fed into the gas container for storage. The sodium formed can be fed to the thermal energy storage device system. Step c) can basically continue until the sodium chloride has been almost completely reacted. Consequently, the thermal energy produced in a solar thermal power plant can be converted to electrical energy during step c) in a heat-power process. A voltage required for storage may depend in particular on a temperature of the electrochemical cell. The voltage may decrease with increasing temperature. Thus, a higher temperature may be targeted during a charging phase than during a discharging phase:

Step d) may also be referred to as an electrochemical discharge phase. During step d), an electrochemical back reaction may occur, which denotes a further electrochemical conversion by means of the electrochemical cell, by which the storage medium converted in step c) is formed again. A sodium atom can donate an electron and pass into the liquid sodium chloride as a sodium cation. At the second electrode, a $Cl_2$ molecule from the gas can accept two electrons and passes into the electrolyte as two chloride anions. An electrochemical potential can be formed, which can be used to generate electricity. The electricity can be fed into a power grid. By using the 3-phase electrode, the reverse reaction can take place. During step d), a lower temperature can be targeted in the electrochemical cell than during the charging phase. This can result in a discharge of the electrochemical cell over at least nearly all of the phase of the discharge at a higher power, and thus more electrical energy can be extracted than was required for storage. A difference in energy can come from a thermal energy difference, which in particular can ultimately come from an energy from the solar power plant. Any thermal energy that may be generated during discharge can be supplied to the thermal energy storage device, where it can be transferred to the sodium operating as the primary heat transport medium. This can transport the thermal energy to the thermal power process, which converts the heat to electrical energy.

The storage medium may comprise sodium chloride, and step d) may in particular comprise the following substeps:
d1) tapping an electric current from the electrochemical cell;
d2) converting the sodium to the sodium cations at the first electrode, the first electrode being connected as an anode; and
d3) converting the chlorine to the chlorine anions at the second electrode, wherein the second electrode is connected as a cathode.

Step e) may also be referred to as the thermal discharge phase. Once the chlorine gas is at least almost completely converted back into the electrolyte solution, step e) can begin. The sodium present in the thermal energy storage device can release thermal energy to the thermal power process, particularly by means of a pump, and flow into the vessel at a lower temperature. Droplets of the sodium chloride and/or calcium chloride can solidify in the container due to the sodium being cold in comparison to solid particles and can give off heat of crystallization to the sodium. The sodium may enter the thermal storage container in a cold state coming from a steam generator, particularly from below. The mixture comprising sodium chloride and calcium chloride formed in the electrochemical cell may be conveyed to a top of the container, for example, by a pump or mechanism having a conveying action. There, the liquid mixture comprising sodium chloride and calcium chloride may drip down into the cool sodium from a nozzle or from a sieve bottom. Due to their small size, individual droplets of the mixture can solidify on contact with the sodium, can give off their solidification heat in the process and, solidified, can sink to the bottom of the container against the sodium flow, where a layer of particles builds up, especially as it is present at the beginning of the charging process. This heats the sodium on its way up.

Through the sodium, this heat can be transported to the thermal power process for electricity generation. In turn, the packed bed can form. Once the container is filled with particles, the sodium can continue to dissipate heat until the power-heat process can no longer be economically operated. At that point, the discharge phase is complete.

Step e) may in particular comprise the following substeps:
e1) solidifying of the thermal storage medium into solid particles;
e2) releasing heat of crystallization;
e3) absorbing the heat of crystallization by the sodium of the container; and
e4) transporting the heat of crystallization to a thermal power process.

In another aspect of the present invention, a use of a device as already described or still to be described hereinafter is proposed for storing and providing thermal energy from solar thermal power plants and/or for storing and providing electrical energy from wind power plants. For the listed uses, another container for gas can in principle be used. Other uses are also conceivable in principle.

EXAMPLES OF EMBODIMENTS

Approximate material values and simplifying assumptions are used for the following examples; the examples serve to show the orders of magnitude of the system properties.

As a first example, a concentrating solar thermal power plant, in particular a solar thermal tower power plant, with an electrical output of 2.18 MW and a storage for 6 hours is described. The term "concentrating solar thermal power plant" basically refers to any solar thermal power plant in which, in particular in a difference to a non-concentrating solar thermal absorber, incident sunlight is concentrated by optical devices, especially before it hits a thermal absorber. Thus, in principle, an energy per area can be increased and an absorber area of the thermal absorber can be made smaller by a concentration ratio for an equal transferred heat, as compared to a non-concentrating absorber. In concentrating solar thermal power plants, concentration of light is usually achieved by mirrors. In tower power plants, a light reflected from a plurality of mirrors is directed to an absorber surface located at a top of a tower. The thermal energy storage device may include a source of thermal energy, particularly to be brought to an operating temperature. The source may be, in principle, an electric heater, a gas burner, or a "solar thermal power plant," as well as other heat sources.

In the present example, a small concentrating solar thermal power plant with a thermal output of 6 MW is assumed. A theoretical maximum electric power that can be obtained from thermal power can depend, in principle, on a temperature level at which the thermal energy is provided. A temperature of thermal energy in this example is set to 800° C. at the beginning. This corresponds approximately to a melting temperature of sodium chloride. The thermal energy storage device system can deliver thermal energy at this temperature to a thermal power process for electricity generation. Based on a temperature of heat supply, the maximum electrical power $P_{el}$ that can be achieved from a thermal power Pth, according to Carnot is:

$$P_{el,max} = P_{th} \cdot \eta_C = P_{th} \cdot \left(1 - \frac{T_{min}}{T_{max}}\right) = 6 \text{ MW} \cdot \left(1 - \frac{298.15K}{1073.15K}\right) = 4.33 \text{ MW}$$

Where $\eta_c$ corresponds to the Carnot efficiency and $T_{min}$ and $T_{max}$ to a minimum and maximum temperature, respectively. In order to take into account that this ideal value cannot be achieved in reality, in the following only half of the ideally achievable power is conservatively assumed as the real achievable electrical power, i.e. $P_{el,real}$=2.17 MW. A ratio of electrical to thermal power can therefore be:

$$\varepsilon = \frac{P_{el,real}}{P_{th}} = 0.36$$

During a period of six hours at full load, such a solar thermal system can generate 13 MWh (46.8 GJ) of electrical energy. It is now assumed that the storage tank is already at a temperature of 800° C., but the sodium chloride is still in its solid state of aggregation. An amount of sodium chloride required to store this amount of energy can be calculated for this case as follows:

$$m_{NaCl} = \frac{E_{el}}{C_{NaCl} + \varepsilon(\Delta^m H_{NaCl})} = \frac{46797 \text{ MJ}}{5.42 \frac{MJ}{kg} + 0.36(0.52)\frac{MJ}{kg}} = 8.3 \text{ } t$$

$C_{NaCl}$ is the mass-specific electrochemical storage density of sodium chloride, $\Delta^m H_{NaCl}$ is the mass-specific enthalpy of fusion, and $\varepsilon$ is the efficiency at which thermal energy can be converted to electrical energy, taking losses into account. A storage density is defined here as a total amount of electrical energy that can be stored in the thermal storage tank by converting common salt to sodium, based on the mass of sodium chloride present in the system before the start of electrochemical conversion. It amounts to 5.42 MJ/kg (1.5 kWh/kg). The mass just determined can therefore also store the sensible amount of energy required to raise the storage temperature to the melting temperature of the salt. After melting of the salt, the process temperature is increased slightly to avoid solidification of salt. This further temperature increase is neglected in this example.

With a density of sodium chloride of 2.16 g/cm², approx. 3.9 m³ tank volume is therefore required. Since sodium chloride is basically present at the beginning as a bulk, which has cavities between individual salt particles, the tank can still be about 30% larger, namely 5.0 m³. A cylindrical tank, in which one height corresponds to one diameter, can have a height and diameter of $$H = D = \sqrt[3]{(4V/\pi)} = 1.86 \text{ m}.$$

Accordingly, the sodium located in the interstices may have a volume of slightly more than 1.2 m³ and a mass of about 1 t.

Further details of this embodiment are shown in FIG. 5 and given in the explanatory notes to FIG. 5.

As a further embodiment example, a wind turbine with an electrical power of 2 MW and a storage for 6 hours can be realized. This may be of particular interest for German locations. In principle, the wind turbine can also be replaced by a photovoltaic system of the same electrical output. Instead of storing thermal energy from the sun as in the previous example, it is assumed here that electrical energy is also used for heating the thermal energy storage device and for filling up a latent storage capacity of the thermal energy storage device, since it may be that the operation of the thermal solar power plant is not economical at German locations.

The electrical output of a wind power plant is 2.17 MW, i.e. identical to the electrical output of the solar thermal power plant according to the first embodiment example above. The operating sequence is thus largely similar to that of the previous example. The storage content can, in the case of the wind power plant, generally, instead of thermal only with the help of higher-value electrical energy be heated up from 97.8° C. to 800° C. and, with additional electrical energy, be molten. Since this amount of energy is basically no longer electrical but thermal after melting, it can only be converted back into electrical energy with the efficiency of 36% assumed here when it is removed from storage, provided that a heat engine is provided for this conversion. The heating process is therefore more expensive with the use of electrical energy than in the previous example.

In the solar thermal power plant, therefore, an additional profit can be earned during the withdrawal from the thermal energy storage device, as soon as the electricity price rises above the level that could be achieved during the injection. Therefore, a reasonable mode of operation of the thermal-electrochemical energy storage is one with always molten salt content, so that only its electrochemical capacity is used. In this case, however, the capacity of the storage can be related to approximately the electrically storable portion, and for the thermal energy storage device, in general, a larger amount of salt is provided compared to the storage considered above for a solar thermal power plant, in order to provide the required capacity:

$$m_{NaCl} = E_{el}/C_{NaCl} = (46797 \text{MJ}/5.4 \text{MJ/kg}) = 8.7 \text{ t.}$$

A 0.4 t larger quantity of sodium chloride is therefore required.

The storage density may decrease slightly as a result, and may then be 1.5 kWh/kg, based on 1 kilogram of sodium chloride.

As a further example of an embodiment, a concentrating solar thermal power plant with an electrical output of 100 MW and storage for 18 hours is described below. Reference can be made, at least in part, to the above. The thermal energy storage device of a Mediterranean solar thermal power plant can generally provide 100 MW of electrical energy for 18 hours. Therefore, a capacity of 1.8 GWh (6.48 TJ) can be assumed. For this purpose, the following amount of sodium chloride can be used, assuming the same efficiency:

$$m_{NaCl} = \frac{E_{el}}{C_{NaCl} + \varepsilon \Delta^m H_{NaCl}} = \frac{6480000 \text{ } MJ}{5.39 \frac{MJ}{kg} + 0.36 \cdot 0.54 \text{ } KJ/kg} = 1096 \text{ } t$$

This may require a bulk of approximately 660 m³ volume of thermal energy storage device. Therefore, a height and/or diameter of the thermal energy store may be approximately 9.4 m. Approximately 1.25 TJ can be stored thermally in principle, and a remaining amount of energy can be electric in principle. Accordingly, the invention can be used across different orders of magnitude of the required storage capacity.

Advantages of the Invention

The proposed device and associated method for thermal-electrochemical energy storage and energy provision have, compared to devices and methods known in the prior art, a number of advantages.

In principle, there are a variety of phase change materials potentially suitable for use in thermal energy storage devices, but there is generally no material compatibility with a primary heat transport medium. Typically, phase change materials are encapsulated, for example in small metal spheres, or in at least nearly closed troughs or spheres. The capsules can provide an additional thermal barrier to heat transfer to the phase change material and increase investment costs due to the required step of encapsulation. In the device according to the present invention, the heat transport medium is basically compatible with the storage medium. Encapsulation may not be required. The heat transport medium and the storage medium may be in direct thermal and chemical contact with each other. A formation of at least nearly pure phases and a difference in density of the materials used in the context of the present invention may, in interaction with, for example, a solar thermal power plant, allow the fixed bed to be rebuilt by dropping the molten salt into the heat transport medium without significant, adverse mixing of the materials.

Electrochemical cells typically have a fixed membrane in the electrolysis toe, particularly to selectively allow ions of a particular type to pass through, but to retain other substances present in the cell. Each membrane usually presents a barrier to charge transport. The membrane may, for example, be chemically attacked, become clogged, or form cracks. The device and method according to the present invention allow in principle to dispense with such a membrane and to use a mixture of sodium chloride and calcium chloride. Sodium chloride and calcium chloride are basically available in abundance and at low cost on earth.

The electrochemical cell may be configured to be membrane-free. Further, the electrochemical cell may have only a very small amount of different species of substances, thereby avoiding undesirable side reactions. The electrochemical cell according to the present invention may have a simple design. Simultaneous contact of electrode material, electrolyte and chlorine may be enabled at the 3-phase electrode. Thus, a reversal of the electrochemical charging process can be realized. Furthermore, in the device according to the present invention, the electrochemical cell is directly coupled to the thermal energy storage device system and to the operation of a solar thermal power plant, which makes all three systems strongly mutually beneficial. The storage medium and the heat transport medium are basically inexpensive, so a low-cost storage concept can be realized.

In the electrochemical cell with the 3-phase electrode, the chemical reaction of sodium chloride to sodium and chlorine gas can proceed in both directions. This allows sodium and chlorine to be used as electrochemical storage media. Since they occur as elementally pure substances, they can basically be stored for an unlimited period of time—for example, after being stored in the summer, during which a lot of electricity is generated from photovoltaics due to many hours of sunshine, until the winter. Thus, such thermal energy storage device can contribute to the solution of the problem that despite a high installed generation capacity of wind and photovoltaic plants, large supply gaps occur on days in winter without wind and sun. This solution thus potentially makes concentrating solar thermal technology economically attractive for its use in Germany.

The electrochemical reaction allows in principle to store very large amounts of electrical energy in the formation of chemical products. This process is usually energy intensive, for example in the electrolytic formation of sodium and chlorine itself, since heat, which is needed to maintain the liquid aggregate state, is provided by electrical power. In the present invention, this expensive and valuable form of energy is provided by relatively inexpensive heat from a concentrating solar thermal system. Thus, the storage of the electrical energy can be much less expensive in comparison. Moreover, the device can also convert its own excess heat into electrical energy in a thermal power process at times when electrical energy is not available for storage from the grid, and store it in sodium and chlorine gas through the electrolysis reaction. After the failure of the thermal energy source, especially the sun, the thermal energy from the thermal energy storage device can still be used in the thermal power process to generate electrical energy.

The device can be used in multiple, adjacent solar farms or wind turbines, which in the most favorable case produce direct current and are coupled to a common storage. A coupling of power into an interconnected grid can then be performed centrally via a storage facility with a substantially constant power output over time and using a set of substation and inverter technology. Furthermore, the device can be used as medium- or long-term storage in an interconnected grid. Other areas of application are also conceivable in principle.

Figure 2A:
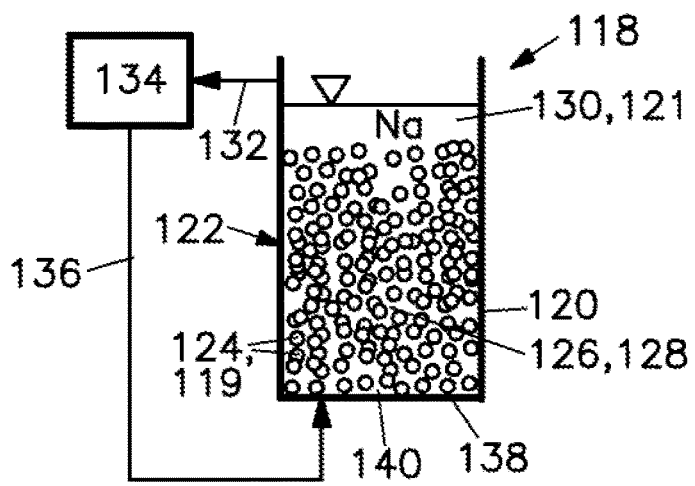
Figure 2B:
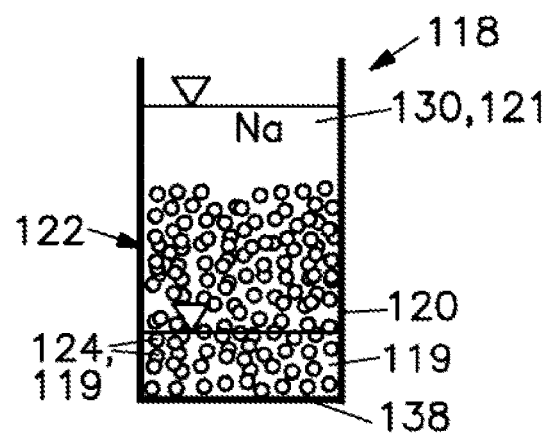
Figure 2C:
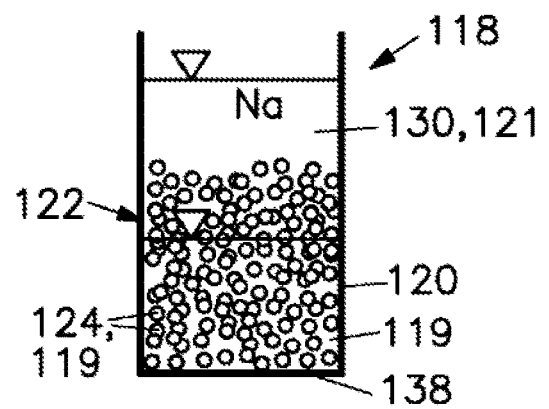
Figure 2D:
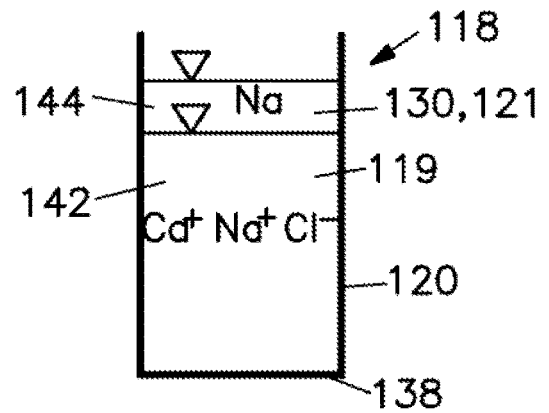
Figure 3A:
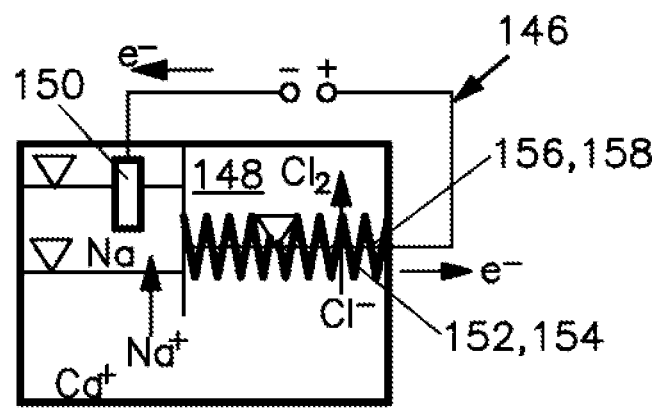
Figure 3B:
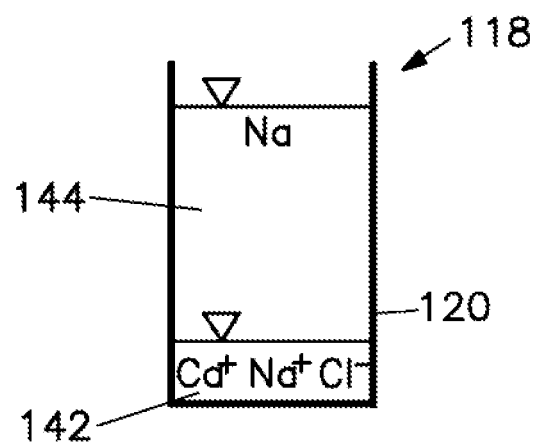
Figure 4:
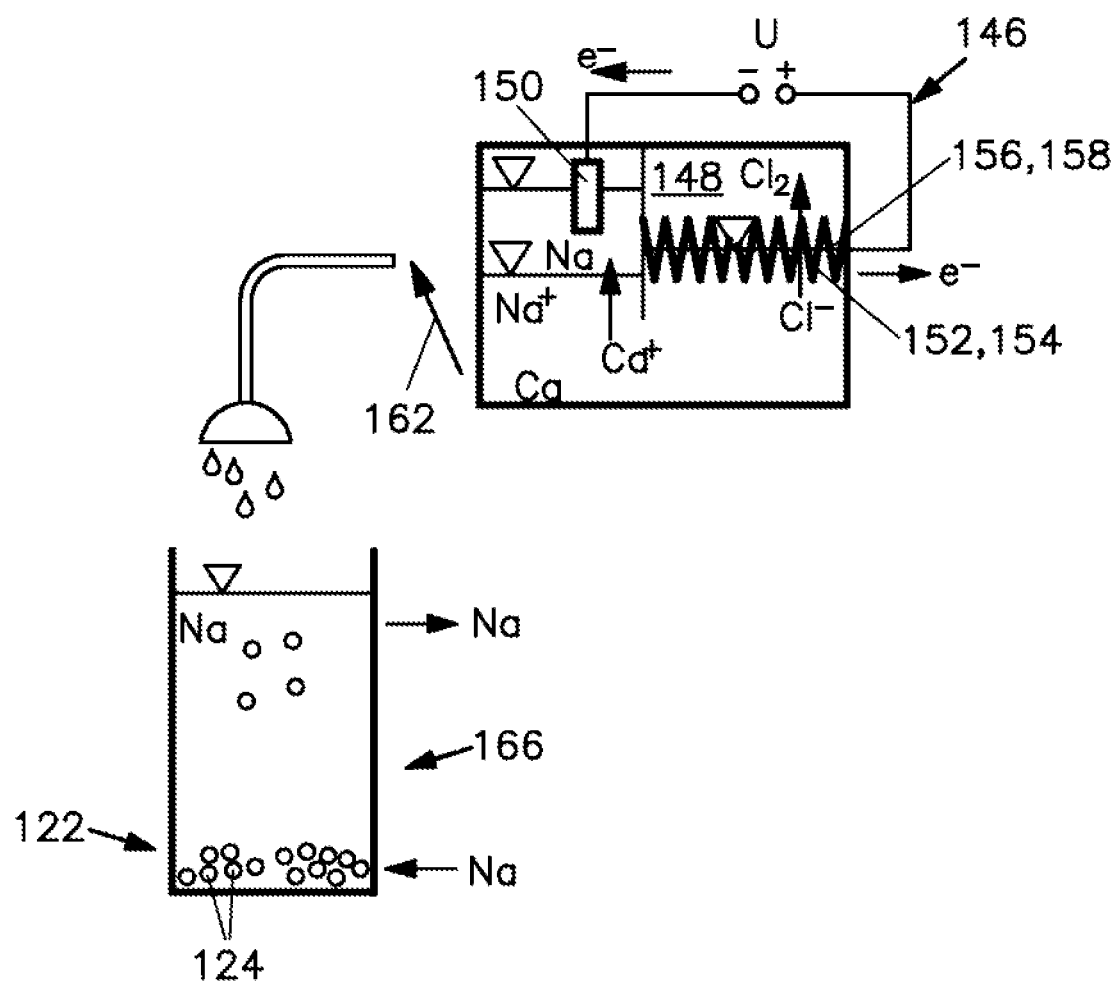

In detail show:

FIG. 1 a schematic representation of an embodiment of a device according to the invention;

FIG. 2A to FIG. 2D a schematic representation of step b) of the process according to the inventive method FIG. 3A and FIG. 3B a schematic representation of an electrochemical cell of a device according to the invention (FIG. 3A) and a schematic representation of a thermal storage container after carrying out step c) (FIG. 3B);

FIG. 4 a schematic representation of the process steps d) and e) according to the present invention; and FIG. 5 an illustration of operations in a thermal energy storage device system according to an embodiment of a concentrating solar thermal power plant with an electric power of 2 MW and a storage for 6 hours.

DESCRIPTION OF THE EMBODIMENTS

FIG. 1 shows a schematic diagram of an embodiment of a device 110 according to the invention. The device 110 may be attached to a tower top 112 of a tower 114 of a solar thermal power plant. The device 110 may be irradiated with concentrated sunlight, as shown schematically with arrows 116. For further details regarding a structure and an operation of the device 110, please refer to the discussion of FIGS. 2-5.

FIGS. 2A to 2D show a schematic representation of step b) of the method according to the invention.

To begin with, a thermal energy storage device 118 is provided. The thermal energy storage device 118 may in particular be formed as a container 120. The thermal energy storage device comprises at least one heat transport medium 121 and at least one storage medium 119 selected from the group consisting of: an electrochemical storage medium, a thermal storage medium. In particular, the thermal energy storage device 118 may comprise sodium chloride, calcium chloride, and sodium.

Initially, as shown in FIG. 2A, the thermal energy storage device 118 may comprise a fixed bed 122 of particles 124. The particles 124 may include sodium chloride and calcium chloride. In particular, the calcium chloride may be admixed with the sodium chloride to provide a melting point of a mixture of calcium chloride and sodium chloride of 560° C. Channels 126 may be located between the particles 124, particularly free channels 128. A fluid may flow through the channels 126. The fluid 130 may comprise sodium. The vessel may initially have a temperature of 150° C. At the temperature of 150° C., the sodium may be present in liquid form and may be used as a fluid filling the free channels of the packed bed. The sodium can be transported by a pump into a heating device 134 (shown here schematically with arrow 134). In the heating device 134, the sodium can be heated to a temperature of 560° C. Subsequently, the sodium can be transported back to the thermal energy storage device 118 (schematically shown here with arrow 136). In particular, the sodium can re-enter at the bottom 138 of the thermal energy storage device 118.

The sodium can flow through the free channels 128 between the particles 124 and deliver its thermal energy to the particles 124. Upon further energy input, the particles 124 become liquid, as shown in FIGS. 2B through 2D. Due to a lower density of sodium compared to sodium chloride and calcium chloride, the molten salt may sink to a ground 140 of the container 120.

As shown in FIG. 2D, the sodium chloride and calcium chloride may at least nearly completely transition to a liquid aggregate state. A first phase 142 may be formed, comprising sodium chloride and calcium chloride. Floating on top of the first phase 142 may be a second phase 144 comprising sodium.

FIG. 3A illustrates a schematic diagram of an electrochemical cell 146 of a device 110 according to the invention. The electrochemical cell 146 includes a gas compartment 148, and a first electrode 150 and a second electrode 152. The second electrode 152 is configured as a 3-phase electrode 154. The 3-phase electrode 154 includes at least a first phase boundary 156 to the gas compartment 148 and at least a second phase boundary 158 to the sodium chloride and calcium chloride. The electrochemical cell 146 may be configured to convert sodium cations of the sodium chloride to elemental sodium and to convert chloride anions of the sodium chloride to chlorine, particularly chlorine gas. The chlorine gas may pass into gas compartment 148. Subsequently, the chlorine gas may be directed into gas cylinders (not shown) for storage.

Referring to FIG. 3, a schematic diagram of a thermal energy storage device 118 is shown after performing step c). After electrochemical conversion of sodium chloride to sodium and chlorine using electrochemical cell 146, a majority of the sodium chloride may have been converted.

FIG. 4 shows a schematic representation of process steps d) and e) according to the present invention. During step d), an electrochemical back reaction may occur. The sodium may donate an electron and may pass into the liquid sodium chloride as a sodium cation. At the second electrode 152, a $Cl_2$-molecule may accept two electrons from the gas and pass into the electrolyte as two chloride anions. An electrochemical potential can be formed, which can be used to generate electricity. By a use of the 3-phase electrode 154, the back reaction can take place. During step d), a lower temperature may be targeted in the electrochemical cell 146 than during the charging phase. This may result in a discharge of the electrochemical cell 146 over at least substantially the entire phase of the discharge at a higher power, and thus more electrical energy may be extracted than was required for storage.

Once the chlorine gas is at least nearly completely converted back into the electrolyte solution, step e) can begin. The sodium, which is present in the thermal energy storage device 118, can release thermal energy to the thermal power process and flow into a container 160 at a lower temperature (shown schematically with arrow 162). Droplets of the sodium chloride and/or calcium chloride may solidify into solid particles 124 in the container 160 due to the comparatively cold sodium, and may release heat of crystallization to the sodium. The sodium may transport this heat to the thermal power process for power generation. In turn, the fixed bed 122 can form. Once the vessel 160 is filled with particles 124, the sodium can continue to dissipate heat until the power-to-heat process can no longer be economically operated.

FIG. 5 shows an illustration of operations in a thermal energy storage device system in accordance with an embodiment of a concentrating solar thermal power plant having an electrical output of 2 MW and a storage for 6 hours. This is an illustration of the first embodiment example explained in the above description.

A diagram is shown schematically illustrating a temperature of the thermal energy storage device 118 and a content of the thermal energy storage device 118 during the various process phases. It is assumed here that the thermal energy storage device 118 has a temperature corresponding to an ambient temperature at the beginning (before phase 1 in the diagram). This may be the case, for example, during an initial start-up or after maintenance work. During phase 1 in the diagram, the amount of sodium circulating as a heat transport medium between the thermal energy storage device and the heating device 134 may be liquid. This can be done, particularly electrically, by heating the sodium from 300 K to 372 K, which corresponds to the melting temperature of sodium, and going through the phase change. Likewise, the amount of sodium chloride present as a solid bulk must be heated. Since this energy is stored as thermal energy, which must first be converted back into electrical energy, this process is basically of little significance in terms of electrical storage capacity, since this heat is present at a very low level. A start-up and shut-down process is only occasionally required, and the system is generally maintained at a temperature level above the melting point of sodium. This will result, through sufficient thermal insulation, in basically only a small amount of electrical power being required to maintain this temperature. During shutdown, some of this thermal energy can still be converted into electrical energy. In the process, the temperature drops continuously and the efficiency of the conversion deteriorates, so that the efficiency previously used can no longer be expected. Assuming that the efficiency is only a quarter of that specified in the embodiment examples as $\varepsilon=0.36$, this amount of energy accounts for about 0.1% of the total amount of electrical energy that can be stored (noted as 0.1% in the figure).

Subsequently, the now liquid sodium and the solid sodium chloride are heated up to a temperature of about 800° C. (phase 2). In combination with a solar thermal power plant, this is done by supplying thermal energy. The amount of energy thermally stored as a result accounts for about 1.1% of the equivalent electrical storage capacity of the reservoir.

As soon as the temperature of 800° C. is reached, an isothermal operating phase begins (=operation at constant temperature, phases 3, 4, 5, 6, 8, 9, 10, 11). The hot, liquid sodium moves upward by releasing its thermal energy through the NaCl bed in thermal energy storage device 118. Once the melting temperature is reached by the salt mixture, drops of molten salt sink to the bottom of vessel 120, where they form a liquid phase on which the sodium floats due to its lower density. The thermal charging process (phases 2, 3) is completed as soon as the salt has changed to the liquid aggregate state. Melting requires an amount of energy that, assuming $\varepsilon=0.36$ equivalent, is slightly less than 4% of the electrical storage capacity of the reservoir. Liquid salt can then be continuously transported during phase 4 to the electrochemical cell 146, where sodium and chlorine are electrochemically generated with the application of an electric current. The sodium can be returned to thermal energy storage device 118 where it becomes part of a floating phase. Once the sodium chloride in the tank is converted to sodium and chlorine, the electrochemical charging process is complete. The thermal energy storage device 118 is at least almost completely charged with electrochemical energy. Now, at most, further thermal energy can be added, which would cause the temperature to rise (not shown in the diagram). The thermal and electrochemical charging processes can run simultaneously. For electrochemical discharging (phase 5), the electrochemical cell is operated with reversed polarity compared to charging and liquid sodium chloride is formed from sodium and chlorine. Thereafter (phase 6 or simultaneously), thermal energy is removed from the liquid sodium in the thermal energy storage device 118 so that the sodium temperature drops below the melting temperature of the sodium chloride-calcium chloride mixture. The salt mixture formed in the electrochemical cell 146 can then be dropped (first half phase 7) into the liquid sodium, where it gives up its thermal and solidification energy to the sodium. The salt crystallizes into particle 124 and rebuilds the bulk. The volume of sodium continuously displaced by the addition of salt is fed to the electrochemical cell. Electrochemical and thermal discharge thus also occur, at least partially, simultaneously. Then a loading phase can begin again.

As soon as a part of the salt mixture is liquid, electrical energy from the thermal power process of the solar power plant can be stored electrochemically. For this purpose, the solid initial mass of sodium chloride is electrochemically converted to 38% sodium and 62% chlorine gas. The latter requires, for example, a pressure vessel in which the $Cl_2$ can be stored in liquid form at room temperature and greater than 7.5 bar. By running off the back reaction, this electrical energy is recovered. Once the electrochemical back reaction has started during discharge, sodium chloride is formed. This is dropped into cool liquid sodium in the thermal energy storage device system, forming salt crystals that sink to the bottom. Thus, the solid bulk is renewed. Heat is released during crystallization. As soon as the thermal energy storage device 118 is filled again with the salt bed, the isothermal discharge phase is completed. It is now still possible to thermally discharge the entire thermal energy storage device 118 to just above the melting temperature of the sodium.

Assuming a recoverable electricity price of 6 ct/kWh, and for a cost assumption for sodium chloride of about 2 ct/kg, the storage facility can store electrical energy for about 1.3 ct/kWh, based on raw material costs. In comparison, energy storage in a storage medium that is currently state of the art in solar thermal, solar salt, based on raw material costs in solar thermal power plants is currently about 25 €/kWh. The investment cost for the amount of salt required in the thermal energy storage device 118 is basically amortized after only one isothermal charging and discharging cycle at this assumed electricity and raw material price.

LIST OF REFERENCE SIGNS

110 Device
112 Tower top
114 Tower
116 Arrow
118 Thermal energy storage device
119 Storage medium
120 Container
121 Heat transport medium
122 Fixed bed
124 Particle
126 Channel
128 Free channel
130 Fluid
132 Arrow
134 Heating device
136 Arrow
138 Bottom
140 Ground
142 First phase
144 Second phase
146 Electrochemical cell
148 Gas compartment
150 First electrode
152 Second electrode
154 3-phase electrode
156 First phase boundary
158 Second phase boundary
160 Container
162 Arrow

What is claimed is:

1. A device (110) for thermal-electrochemical energy storage and energy provision, comprising
    at least one thermal energy storage device (118), the thermal energy storage device (118) comprising at least one heat transport medium (121) and at least one storage medium (119) selected from the group consisting of: an electrochemical storage medium, a thermal storage medium;
    at least one heating device (134), wherein the heating device (134) is adapted to receive the heat transport medium (121) from the thermal energy storage device (118), heat it, and return it to the thermal energy storage device (118);
    at least one electrochemical cell (146), the electrochemical cell (146) comprising at least one gas compartment (148), the electrochemical cell (146) further comprising at least one first electrode (150) and at least one second electrode (152); wherein the second electrode (152) is formed as a 3-phase electrode (154), the 3-phase electrode (154) having at least a first phase boundary (156) to the gas compartment (148) and at least a second phase boundary (158) to the electrochemical storage medium (119); wherein the electrochemical cell (146) is adapted to electrochemically convert the electrochemical storage medium (119); and
    at cast one container (160), wherein the container (160) is adapted to receive a supply of the heat transport medium (119), wherein the container (160) is further adapted to receive the thermal storage medium (119) from the thermal energy storage device (118).

2. The device (110) according to the preceding claim, wherein the thermal storage medium (119) comprises sodium chloride and calcium chloride in solid form, wherein the electrochemical storage medium (119) comprises sodium cations and chloride anions in liquid form, and wherein the heat transport medium (121) comprises sodium.

3. The device (110) according to any one of the preceding claims, wherein the thermal storage medium (119) is adapted to than a fixed bed (122).

* * * * *